April 22, 1952     E. P. MASSON     2,594,048
CHRONOGRAPHIC ARRANGEMENT FOR ELECTRIC STATIONS
Filed June 26, 1947     2 SHEETS—SHEET 1

INVENTOR
EMILE PIERRE MASSON

By Adams & Bush
ATTORNEYS

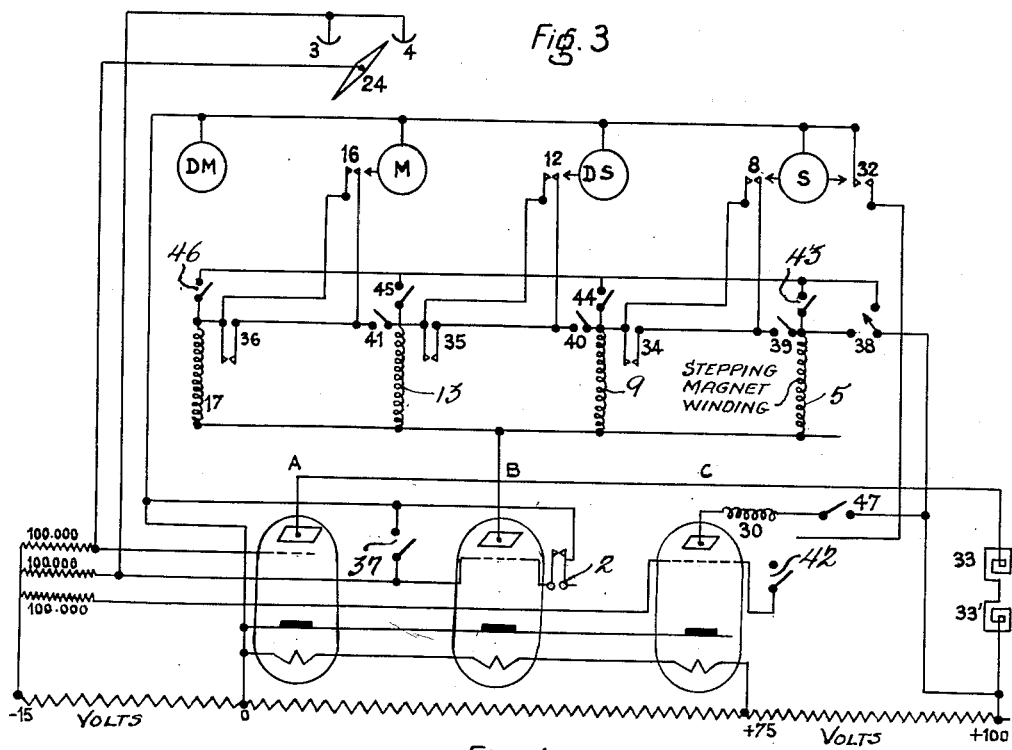

Patented Apr. 22, 1952

2,594,048

UNITED STATES PATENT OFFICE 2,594,048

CHRONOGRAPHIC ARRANGEMENT FOR ELECTRIC STATIONS

Emile Pierre Masson, Saint-Maurice, France

Application June 26, 1947, Serial No. 757,165
In France June 28, 1946

6 Claims. (Cl. 346—33)

The present invention relates to apparatus for the registering and recording of measurements and particularly the recording of time measurements.

In effecting the recording or registration of any kind of phenomena, it is generally desirable to know precisely the instant at which the phenomenon takes place. For example, in an operating electric power station, the knowledge of the precise instant of time at which an event takes place has an importance which is not always sufficiently realized. Registering devices comprising tape reels rotating at low speed are not able to give such a precise time record. The oscillographic registering of disturbances such as electric surges has come into general use, but such oscillographic registering apparatus does not comprise any basis of reference to time.

The present invention has for an object to provide an arrangement which permits, without the addition of any auxiliary relays, the determination of the particular minute and second at any instant of time, and provides a permanent apparatus for the generation of electrical signals which may be transmitted to all of the high speed recording devices of an electric power station in such manner that they can record or register the precise instant of the occurrence of an electric disturbance.

This arrangement of the present invention comprises a principal chronometric member and subordinate chronometric members, arranged in the manner of the time elements of a time piece, and is characterized essentially by the fact that each subordinate member is provided with a plurality of series of electric contact elements, the number of electric contact elements of the various series corresponding respectively to the consecutive numbers of secondary units of measured time, and that a movable member is controlled in such a manner as to be brought periodically into contact with certain of the subordinate chronometric members in such manner as to make contact with the series of contact elements which are presented thereto, according to the position taken up by the subordinate member with the passage of time, and providing in this manner for controlling an electric supply circuit for devices which are adapted to register a signal for each one of the contacts encountered by the movable member.

The records or registrations obtained by means of this arrangement permit of comparing with an accuracy of one one-hundredth of a second the records of the various high speed recording reel devices. It is also possible, with this arrangement, to compare with the same precision the records obtained at two different power stations. For this purpose, it is possible, after the occurrence of a phenomenon to transmit by means of a telephone line, or by high frequency, from an apparatus of a power station, and at the same time, as the signals of that station, those signals which proceed from another station, this apparatus being provided with two timing devices, one for the first station and the second for the other station.

In a simple embodiment, the device may provide for signals for only minutes and for seconds, because it is assumed that the hour is always known, but provision may also be made for hour signals in the system here described.

The accompanying drawings show, as an example, one embodiment of the chronographic time piece according to the present invention.

In the drawings:

Fig. 3 is a circuit diagram of a modified form of circuit employing electron tubes for transmitting impulses to the recording device, and avoiding the breaking of excessively large currents at contacts; and Fig. 4 is a registration record produced by the chronographic time piece of the present invention.

Fig. 5 shows an assembly of two multi-track tape recorders connected to the chronograph apparatus of Fig. 1.

Figure 1:
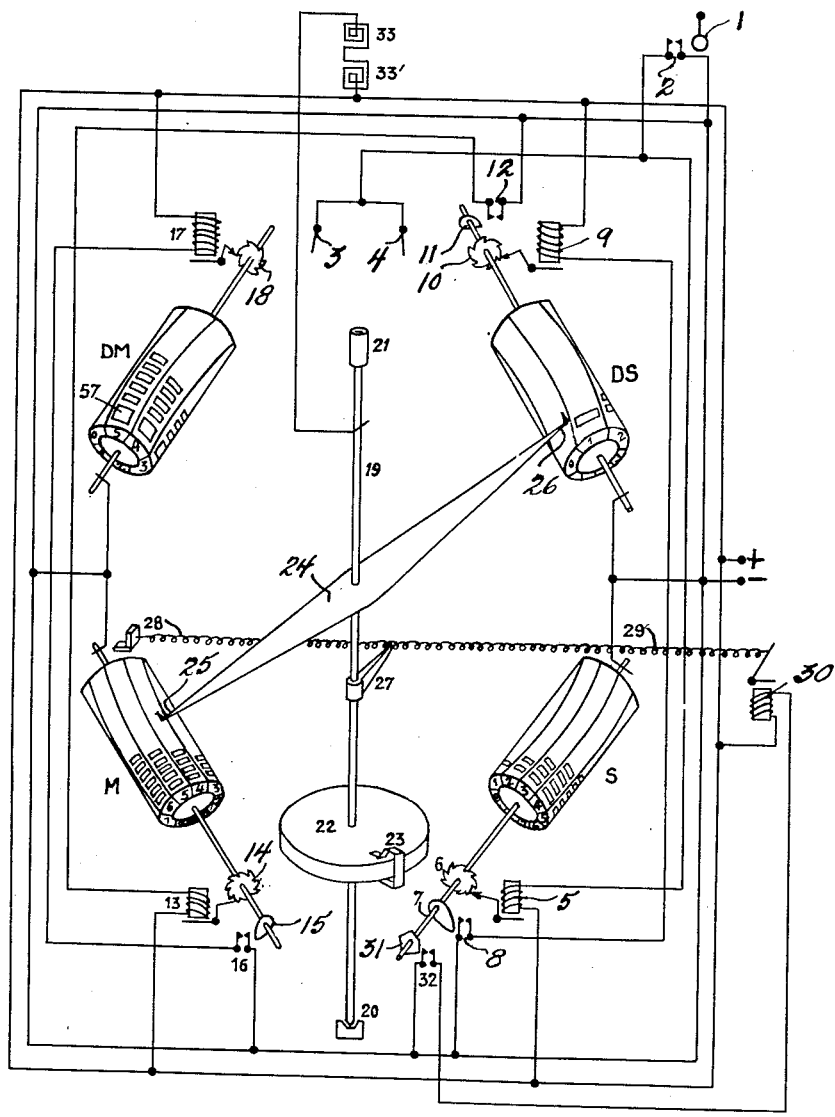
Fig. 1 shows diagrammatically, in perspective, the general arrangement of the system including the circuit connection.

Referring to Fig. 1, the peripheries of four metallic conducting cylinders mounted horizontally on shafts, and respectively indicated by DM (tens of minutes), M (minutes), DS (tens of seconds), and S (seconds), are divided respectively into six, ten, six, and ten, parts circumferentially numbered from 0 to 5 or from 0 to 9, according to the respective case.

There are thus delineated along the axial directions of the cylinders, a certain number of longitudinal bands which carry a number of regularly spaced rows of contact studs corresponding to the number of units marked in figures on the end of the respective band.

At any given instant, the time is characterized by the number of contact studs in the row carried by the band which at that instant is situated at the uppermost point of the cylinder.

An electrical precision pendulum 1, outside of the principal chronographic apparatus, closes precisely at each second, for a length of time which is not necessarily constant, a contact 2 which applies a potential to the flexible contact elements 3 and 4.

At the same time, the contact 2 energizes the stepping electromagnet 5 which causes the advancement by one tooth of the ten-toothed ratchet 6 which is fixed on a shaft which carries the cylinder S.

When this seconds cylinder S passes from the band 9 to the band 0, the cam 7 fixedly carried on the shaft of cylinder S, closes the contact 8 which energizes the stepping electromagnet 9, driving the six-toothed ratchet 10, fixed with relation to the cylinder DS, and causes the latter to rotate by one-sixth of a revolution.

Similarly, when the tens of seconds cylinder DS passes from its band 5 to its band 0, the cam 11 which rotates with cylinder DS closes the contact 12, which energizes the stepping electromagnet 13, which drives the ten-toothed ratchet 14 which, in turn, advances the minute cylinder M by one-tenth of a revolution.

When the minute cylinder M passes from its band 9 to its band 0, the cam 15 which rotates with cylinder M, closes the contact 16, which, in turn, energizes the stepping electromagnet 17, which drives the six-toothed ratchet 18 and advances the tens of minutes cylinder DM by one-sixth of a revolution.

The cam 11, contact 12, and stepping electromagnet 13, for the minutes cylinder or drum M, together with cam 15, contact 16, and stepping electromagnet 17 for the tens of minutes cylinder or drum DM, constitute cascaded control means controlled by the completion of one complete rotation by the tens of seconds cylinder or drum DS adapted to drive in stepped catenary sequence each of the other cylinders or drums M and DM upon the completion of a complete rotation by each of these cylinders or drums respectively.

The long contact stud 57 of cylinder DM produces a signal between the tens of minutes and the minutes to differentiate the "minutes" signals from the "seconds" signals.

Figure 2:
Fig. 2 is a detail of the slotted upper bearing for the spindle.

The vertical spindle 19 is generally similar to the spindle of an electric meter and rests on a sapphire bearing 20. The upper end of spindle 19 may be held in the slot of a mounting piece 21, of which a detail is shown in Fig. 2, and the upper end of spindle 19 may slide from end to end of the slot of mounting piece 21.

A magnetic damping disc 22 is carried on spindle 19, and can move between the poles of one or more magnets such as 23.

Spindle 19 also carries, projecting on both sides thereof, a horizontal arm 24 to the ends of which are fixedly attached two obliquely mounted brushes 25 and 26. These brushes 25 and 26 are very flexible and may consist of small pieces of bronze spiral spring such as are employed in measuring instruments.

An arm 27 is carried on spindle 19 and its remote end is engaged by a first spring 28 which tends to rotate the spindle 19 by about one-quarter of a revolution in a counterclockwise direction, so long as no restraining force is applied against such rotation. There is also attached at the far end of arm 27, a stronger spring 29, which extends in the opposite direction from spring 28, and is attached to an element carried by the armature of deflecting electromagnet 30. When electromagnet 30 is energized, it applies force to spring 29, which pulls against the action of spring 28, and rotates spindle 19 clockwise. This counterclockwise movement of spindle 19 and arm 24 is of such magnitude of sweep as to move brush 25 from its position on contact 3 to the contact stud on minute cylinder M nearest ratchet 14 as terminal positions. The movement between these two terminal positions must be completed in less than one second. The time of one sweep can be varied by adjusting dampers 22—23.

However, when the deflecting electromagnet 30 becomes energized, it pulls on the spring 29, which is stronger than spring 28, and which causes the spindle 19 to rotate about a quarter of a revolution in a clockwise direction from contact 4 to the contact stud on second cylinder S nearest ratchet 6, as terminal positions. Further, when the spring 28 pulls on the arm of spindle 19, the upper part of spindle 19 is drawn toward the left end of the slotted recess of mounting piece 21, the brush 25 of arm 24 comes into contact with the row of contact studs of the tens of minutes cylinder DM and the minute cylinder M, during which interval the other brush 26 is pushed up away from tens of seconds cylinder DS and seconds cylinder S. When the other spring 29 applies force to the arm 27 of spindle 19, to rotate it clockwise, the top of spindle 19 is drawn toward the right end of the slotted recess of mounting piece 21, and the other brush 26 comes into contact with the row of raised contact studs of the tens of seconds cylinder DS and the seconds cylinder S, during which interval the first brush 25 is pushed up away from cylinders DM and M.

The operation of the apparatus which has been described is as follows:

The system is initially set in such a manner in the initial rest position that at the end of an odd numbered second, the arm 24 is at one end of its travel and is in engagement with the contact 3, the deflecting electromagnet 30 being energized due to the fact that the pentagon cam 31 fixedly carried on the shaft of cylinder S is suitably adjusted and maintains the contact 32 closed. The pentagon cam 31 closes its contact 32 only every other second, and is closed at the end of an odd numbered second and open at the end of an even numbered second. The arm 24 swings counterclockwise during an even numbered second and clockwise during an odd numbered second.

As soon as the pendulum 1 closes the contact 2 upon the beginning of an even numbered second, the signal to mark the commencement of a second is transmitted to the recorder devices 33, 33', for applying the time signal, which devices 33, 33', pertain to the oscillographic recorders of the power station, since the contact 3 is still touching the brush 25 of arm 24.

The recording devices 33 and 33' for making a record of the instant of time at which a particular event occurs, may be any simple type of graphic recording ammeter or oscillographic recorder, and may be an ordinary telegraph tape register, which will make a record of the various pulses representing the momentary setting of the various cylinders S, DS, M, DM, giving a record of the type of Fig. 4. Measuring devices can be provided for separately indicating, on the same graphic record, the magnitude at that instant of a quantity to be measured, as a voltage or current, particularly a surge voltage.

An instrument for making such a record at any desired instant is described in my Patent No.

2,098,689, dated November 9, 1937. The two devices 33 and 33' which are connected in series, may record the same time pulses delivered from arm 24 of the chronograph arrangement of Fig. 1.

At the same time, as previously explained, the cylinder S advances by one step of rotation and also causes the advancement, by one step of rotation, if that is necessary, of one or more of the other cylinders, but the contact 32 of pentagon cam 31 opens, thus deenergizing deflecting magnet 30, the spring 28 pulls the arm 24 in the counterclockwise direction toward cylinders DM and M, the long signal indicating the commencement of the second is interrupted since the brush of arm 24 no longer engages contact 3, the brush 25 on swinging over and making contact with the several contact studs in the appropriate rows of cylinders DM and M, gives the short signals for the then existing tens of minutes, and minutes. The arm 24 completes its complete sweep of travel carrying brush 25 from contact 3 to the far end of cylinder M in about 0.8 second and at the end of its travel carries brush 26 into engagement with contact 4. However, in this interval the contact 2 opens under the action of pendulum 1, and on this account, there will not be a new signal transmitted until the contact 2 is again closed at the commencement of the next following odd numbered second.

At this instant, the oscillograph recording devices 33, 33' record the commencement of the following odd numbered second, as has already taken place for the even numbered second, the second cylinder S rotates through one step, current is supplied to the deflecting electromagnet 30 by the closing of the contact 32, the spindle 19 is pulled to the right and arm 24 rotates clockwise, cuts off the signal for commencement of the second because the brush of arm 24 no longer engages contact 4, and the brush 26 sweeps clockwise over the contact studs of cylinders DS and S, and sends the short signals for the tens of seconds and the seconds. This operation is repeated, the reversing swinging of arm 24 being controlled by pentagon cam 31 and deflecting magnet 30. A tape record is obtained like that shown in Fig. 4, which record indicates that at the point marked by the arrow the time time is exactly 23 minutes 47 seconds.

In Fig. 4, reading from left to right, the two short pulses (produced by sweeping over cylinder DM in position 2) immediately following the long dash indicates two tens of minutes, the ensuing separation dash is followed by three short pulses indicating minutes (as produced by sweeping over cylinder M). This is followed by a long dash (due to brush 26 holding engagement with contact 4) indicating the beginning of the seconds record, then four short pulses indicating the tens of seconds according to the position of cylinder DS when swept over, and this is spacedly followed by seven short pulses indicating the position of seconds cylinder S when swept over.

It is to be noted that on this record of Fig. 4, there is quite a long signal between the pulses representing tens of minutes and the pulses representing minutes.

This is provided by a corresponding large contact stud 57 on the tens of minutes cylinder DM, and this is responsible for distinguishing, without ambiguity, between the "minutes" and the "seconds" signal.

The bands on the cylinders which carry the contact studs are not arranged exactly along the direction of the axes of the cylinders, but along those portions of the circumferential surface of the cylinders which are swept over by brushes 25 and 26 as they swing. The cylinders are arranged and oriented in such a manner that the line of sweep deviates by as small a degree as possible from the position of the uppermost linear element of each cylinder. These constructional details are important because the cylinders are necessarily of small diameter as of the order of 25 mm., to avoid the necessity of setting into motion bodies of large mass. In practice, for constructional reasons, the six-toothed ratchets may be replaced by twelve-toothed ratchets, the cylinders DM and DS performing their cycle of movements twice in each rotation and not simply once as has been previously described.

The manner of conveniently and precisely setting the time is as follows: In order that the positions of the cylinders at a given instant shall be easily identifiable, the cylinders carry at the ends of their shafts mechanical transmission arrangements driving large discs which are not shown in the drawings, and the registering numerals to be read at any instant appear through slots provided in screens.

As has been described, the apparatus is not subject to any considerable amount of mechanical wear, because the friction of the brushes 25, 26, is very light. The cylinders may be lubricated with fluid oil, any excess of which descends automatically to the lower portion of the cylinders. The intimacy of contact made by the brushes is, therefore, very good, because they are constantly subject to frictional engagement but without excess of oil being present. However, by reason of the very large number of signals transmitted, which is about 320,000 per day, it is difficult to maintain an acceptable degree of mechanical wear when the brushes must interrupt a current which exceeds a few milliamperes at 115 volts.

To avoid any difficulty of this kind, there may be employed the modified arrangement shown in Fig. 3, in which the brushes are called upon only to control the current delivered to contacts connected respectively to the grid of a three-electrode tube. There are employed, also, two other tubes in such a manner that the contacts controlled by the rotation of the respective cylinders close the circuits, but that the opening of the circuits is effected only by the control of the grid. The tubes employed are those of an ordinary type. By reason of the shortness of the signals, as much as a hundred and fifty milliamperes may be obtained from the output of such a tube, which is sufficient for operating all the devices at one station, but it is possible, if desired, to employ several tubes in parallel, if this becomes necessary.

In this arrangement, the entire system is supplied by the battery of the power station without the employment of any polarization cells. In the arrangement of Fig. 3, the three indirectly heated tubes A, B, C, have their filaments connected in series.

If, for example, the tubes of type 25L6 are employed, the potentiometer being set at 0.5 ampere, there is required only 0.2 ampere in the resistance branch between 0 volts and +75 volts, because this portion is in parallel with the circuit of the filament which consumes 0.3 ampere. The grids of the three tubes are normally —15 volts, this being obtained by resistances which are, for example, 100,000 ohms, which gives a plate current of practically zero.

The tube A energizes the signal devices 33, 33', when its grid is placed at zero potential by the action of the contacts 3, 4, or the contact studs on the cylinders.

The tube B energizes the stepping electromagnet 5, and, if necessary, also the stepping electromagnets 9, 13, 17, by the action of the respective contacts 8, 12, 16, when its grid is placed at zero potential by the contact 2 of the pendulum 1, these stepping electromagnets being provided respectively with holding contacts 34, 35, 36, the current is, therefore, interrupted only by the opening of the contact 2, and the contacts 8, 12, 16, do not interrupt any current.

The tube C energizes the deflecting electromagnet 30 when its grid is placed at zero potential by the contact 42. The assembly of the switch contacts 37, 38, 39, 40, 41, 42, is arranged on a rotatable gang switch assembly and is operable simultaneously by a single hand lever. It has the function of placing at zero potential the grid of the tube B and of interrupting the normal supply to the stepping electromagnets 5, 9, 13, 17, and the deflecting electromagnet 30 for permitting time setting. The contacts 43, 44, 45, 46, are independent push buttons which individually permit the control, at will, of the stepping electromagnets 5, 9, 13, 17, for time setting when their normal supply has been interrupted by the opening of the system of contacts 37, 38, 39, 40, 41, 42.

The switch 47 has the function of permitting, for the purpose of lubrication, for example, the arresting of the movement of the arm 24 without stopping the rotation movements of the cylinders, that is to say, without interfering with the time drive.

The time setting operation is carried out as follows. By operating the lever controlling the gang switch system 37, 38, 39, 40, 41, 42, the automatic operation of the time system is arrested. Then, by acting on the individual push buttons, each cylinder is set in a position corresponding to the time signal given by a phonograph or other time piece, or announced on the radio. The gang switch hand lever is then returned to the position for automatic operation and the time is then set to a second. It will be understood that the particular numerical values as given in the foregoing specification are given only by way of example.

Fig. 5 shows an assembly of several recorders connected to the chronograph device according to the present invention. In Fig. 5, the chronograph of the present invention is shown at 60, and sends as electric currents, signals constituting an elapsed time registration record for the recorder device 33 of an oscillograph recorder unit R1 of the type described in my Patent No. 2,098,689. This recorder unit R1 includes two other recorders 61 and 62 which record the variations of the two currents which may be applied at terminals 71, 72, of a feeder I, on the same tape. Consequently, on the same tape, there will be recorded the traces representing the currents applied at terminals 71, 72, and the trace representing the elapsed time as recorded on recorder 33.

In Fig. 5 there has also been shown a second recorder unit R2 which includes the time recorder device 33' which is similar to recorder device 33. The second recorder unit R2 also includes two other recorders 63 and 64 which record the variations of the two currents which may be applied to terminals 73, 74, of a feeder II. The recorder 33' is connected in series with the recorder 33 of recorder unit R1 in such manner that 33' records the same time record as 33. Hence, on the second tape, it is possible to compare the recorder traces of the currents at terminals 73, 74, with the trace of the time as recorded by recorder 33'.

It will be apparent to those skilled in the art that the system that has been described is susceptible of modification to adapt the same to particular applications, and all such modifications which are within the scope of the appended claims I consider to be comprehended within the spirit of my invention.

I claim:

1. In a time recording device, an electrical oscillographic recorder, a plurality of cylindrical metal drums respectively representing integrally related and progressively increasing lengths of time intervals, each of said drums being peripherally provided with a plurality of longitudinal rows of raised contact studs which rows progressively increase in number of studs in arithmetic progression, row by row, circumferentially of each said drum, master timing means for producing a succession of electric current pulses which are precisely spaced in time, a first shaft fixedly carrying the one of said drums representing the shortest interval of time, electromagnetic step-by-step drive means driven by said master timing means and adapted to rotatably step-by-step drive said first shaft and to advance the said drum carried thereon circumferentially from one said row to the next, means controlled by the rotation of said first shaft through one complete turn and adapted to cause the rotation from one of its peripheral rows to the next of the said drum representing the next shortest time interval, cascaded control means controlled by the completion of one complete rotation by said drum representing the next to the shortest time interval and adapted to drive in stepped catenary sequence each of said other drums upon the completion of a complete rotation by each of said drums respectively, a rotatably mounted spindle comprising brush means carried thereby, auxiliary control means comprising a cam carried by said first shaft and adapted to cause rotation of said spindle in synchronism with said master timing means, said drums and said spindle being so mounted that during rotation of said spindle, said brush means successively engage one said row of each of said drums, and a control circuit connected for controlling said recorder and comprising said brush means connected serially with all of said drums connected in parallel, whereby said recorder can at each instant record the angular position of each of said drums and the time thereby represented.

2. In a time recording device, an electrical oscillographic recorder, a plurality of cylindrical metal drums respectively representing integrally related and progressively increasing lengths of time intervals, each of said drums being peripherally provided with a plurality of longitudinal rows of raised contact studs which rows progressively increase in number of studs in arithmetic progression, row by row, circumferentially of each said drum, master timing means for producing a succession of electric current pulses which are precisely spaced in time, a first shaft fixedly carrying the one of said drums representing the shortest interval of time, electromagnetic step-by-step drive means driven by said master timing means and adapted to rotatably step-by-step drive said first shaft and to advance the said drum carried thereon circumferentially from one said row to the next, means controlled by the rotation of said first shaft through one complete turn and adapted to cause the rotation from one of its peripheral rows to the next of the said drum representing the next shortest time interval, cascaded control means controlled by the completion of one complete rotation by said drum representing the next of the shortest time interval and adapted to drive in stepped catenary sequence each of said other drums upon the completion of a complete rotation by each of said drums respectively, a rotatably mounted spindle comprising brush means carried thereby, auxiliary electrical control means comprising a cam carried by said first shaft and adapted to alternately timedly rotate said spindle in opposite directions through a fraction of a turn in synchronism with said master timing means, said drums and said spindle being so mounted that while said spindle is rotating in one direction, said brush means successively engage one said row of each of certain of said drums successively, and while said spindle is rotating in the opposite direction said brush means successively engage one row each of the others of said drums successively, and a control circuit connected for controlling said recorder and comprising said brush means connected serially with all of said drums connected in parallel, whereby said recorder can at each instant record the angular position of each of said drums and the time thereby represented.

3. In a time recording device, an electrical oscillographic recorder, a plurality of cylindrical metal drums respectively representing integrally related and progressively increasing lengths of time intervals, each of said drums being peripherally provided with a plurality of longitudinal rows of raised contact studs which rows progressively increase in number of studs in arithmetic progression, row by row, circumferentially of each said drum, master timing means for producing a succession of electric current pulses which are precisely spaced in time, a first shaft fixedly carrying the one of said drums representing the shortest interval of time, electromagnetic step-by-step drive means driven by said master timing means and adapted to rotatably step-by-step drive said first shaft and to advance the said drum carried thereon circumferentially from one said row to the next, means controlled by the rotation of said first shaft through one complete turn and adapted to cause the rotation from one of its peripheral rows to the next of the said drum representing the next shortest time interval, cascaded control means controlled by the completion of one complete rotation by said drum representing the next to the shortest time interval and adapted to drive in stepped catenary sequence each of said other drums upon the completion of a complete rotation by each of said drums respectively, a rotatably mounted spindle, an arm fixedly carried on said spindle by its central point, a pair of brush means respectively carried at opposite ends of said arms, the total number of said drums being an even number and constituting two groups of equal numbers of drums, auxiliary control means comprising a cam carried by said first shaft and adapted to alternately timedly rotate said spindle in opposite directions through a fraction of a turn in synchronism with said master timing means, slotted spindle mounting means for rotatably and laterally displaceably mounting one end of said spindle, said auxiliary control means being adapted to alternately displace said one end of said spindle toward opposite ends of said slotted mounting means, said two groups of drums being so mounted that while said spindle is rotating in one direction, and its end is displaced toward a first end of said slotted mounting means, a first said brush means in the then position of said spindle successively engages one said row of each of said drums of a said first group of drums successively, and while said spindle is rotating in the opposite direction and its end is displaced toward the second end of said slotted mounting means, the other said brush means in the then position of said spindle successively engages one said row of each of said drums of the second said group of drums, and a control circuit connected for controlling said recorder and comprising said brush means connected serially with all of said drums connected in parallel, whereby said recorder can at each instant record the angular position of each of said drums and the time thereby represented.

4. In a time recording device, an electrical oscillographic recorder, two pairs of cylindrical metal drums respectively representing seconds, tens of seconds, and minutes, and tens of minutes, said seconds drum and said minutes drum being peripherally provided with ten longitudinal rows of raised contact studs which rows progressively increase in number of studs in arithmetic progression, row by row, circumferentially of each of said seconds and minutes drums, each of said two tens drums being peripherally provided with six longitudinal rows of raised contact studs which rows progressively increase in number of studs in arithmetic progression, row by row, circumferentially of each of said tens drums, master timing means for producing a succession of electric current pulses precisely spaced one second apart, a first shaft fixedy carrying said seconds drum, first electromagnetic step-by-step drive means driven by said master timing means and adapted to rotatably step-by-step drive said first shaft and to advance said seconds drum circumferentially from one said row to the next, second electromagnetic step-by-step drive means actuatable by the rotation of said first shaft through one complete turn and adapted to cause the rotation from one of its peripheral rows to the next of said tens of seconds drum, third electromagnetic step-by-step drive means actuatable by the rotation of said tens of seconds drum through one complete turn during one minute and adapted to cause the rotation from one of its peripheral rows to the next, of said minutes drum, fourth electromagnetic step-by-step drive means actuatable by the rotation of said minutes drum through one complete turn and adapted to cause the rotation from one of its peripheral rows to the next of said tens of minutes drum, a rotatably mounted spindle, an arm fixedly carried on said spindle by its central point, a pair of brush means respectively carried at opposite ends of said arm, auxiliary electrical control means comprising a cam carried by said first shaft and a contact controlled by said cam and adapted to alternately timedly rotate said spindle in opposite directions through a fraction of a turn in synchronism with said master timing means, slotted spindle mounting means for rotatably and laterally displaceably mounting one end of said spindle, said auxiliary control means being adapted to alternately displace said one end of said spindle toward opposite ends of said slotted mounting means, said seconds and tens of seconds drums being so mounted that when said spindle is rotating in one direction and its end is displaced toward the first end of said slotted mounting means, a first of said brush means in the then position of said spindle successively engages one said row of each of said seconds and tens of seconds drums successively, and while said spindle is rotating in the opposite direction and its end is displaced toward the second end of said slotted mounting means, the other said brush means in the then position of said spindle successively engages one said row of each of said minutes and tens of minutes drums, and a control circuit connected for controlling said recorder and comprising said brush means connected serially with all of said drums connected in parallel, whereby said recorder can at each instant record the angular position of each of said drums and the time thereby represented.

5. A device according to claim 3, and a pair of auxiliary initial contacts connected in parallel for energization by said master timing means and mounted for engagement by said brush means at the initial terminal point of the travel of said arm in its respective directions of motion.

6. A device according to claim 4, and a first electron tube having its input connected with said brush means and its output connected to said recorder, a second electron tube having its input connected to said master timing means and its output connected to all of said electromagnetic drive means, and a third electron tube having its input and output connected between the points of said contact of said auxiliary control means.

EMILE PIERRE MASSON.

REFERENCES CITED

The following references are of record in the file of this patent:

UNITED STATES PATENTS

| Number | Name | Date |
|---|---|---|
| 903,640 | Wappler | Nov. 10, 1908 |
| 1,951,226 | Wold | Mar. 13, 1934 |
| 1,994,628 | Townsend | Mar. 19, 1935 |